G. S. MARTIN.
EGG SEPARATOR.
APPLICATION FILED MAR. 19, 1913.

1,074,372.

Patented Sept. 30, 1913.

Witnesses
Robert M. Sutphen
A. S. King

Inventor
GRANT S. MARTIN

By Watson E. Coleman
Attorney

UNITED STATES PATENT OFFICE.

GRANT SHERMAN MARTIN, OF DEXTER, MICHIGAN.

EGG-SEPARATOR.

1,074,372.  Specification of Letters Patent.  Patented Sept. 30, 1913.

Application filed March 19, 1913. Serial No. 755,445.

*To all whom it may concern:*

Be it known that I, GRANT SHERMAN MARTIN, a citizen of the United States, residing at Dexter in the county of Washtenaw and State of Michigan, have invented certain new and useful Improvements in Egg-Separators, of which the following is a specification, reference being had to the accompanying drawings.

This invention relates to improvements in devices for separating the whites of eggs from the yolks, and an object thereof is the provision of a separator comprising a cup having an annular supporting wall, the cup having a concave bottom and an opening formed in the bottom through which the white of the egg is adapted to pass, the bottom being also provided with means for preventing the yolk of the egg from passing through the opening.

Another object of this invention is the provision of a cup having a concave bottom, the bottom having an opening therein to one side of its center, the bottom also having a plurality of spaced upstanding pins extending transversely thereof to prevent the yolk of the egg from passing through the opening, the cup being formed with a discharge lip diametrically opposite the opening in the bottom thereof, and the bottom of the cup being formed with an auxiliary opening between the pins and the lip to completely separate the white from the yolk of the egg when the yolk is discharged from the cup through the lip.

With these and other objects in view, my invention consists in the novel constructions to be hereinafter more fully described, claimed and illustrated in the accompanying drawing, in which—

Figure 1:
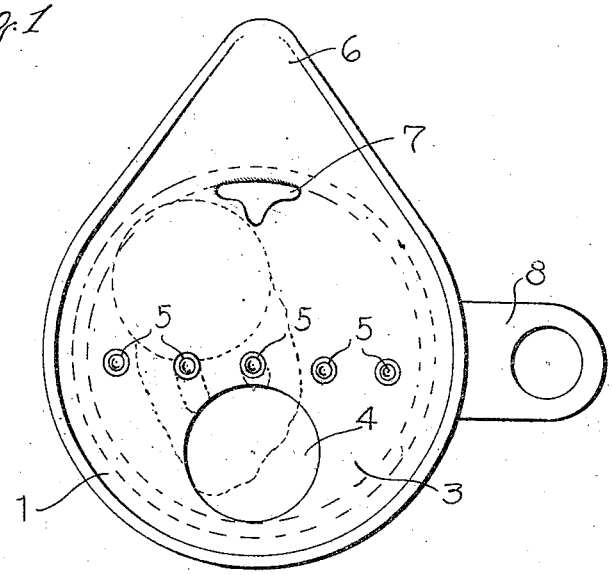
Figure 2:
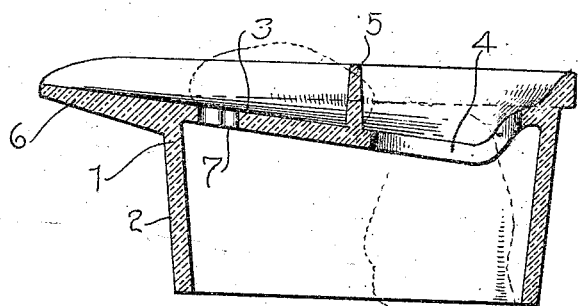

Figure 1 is a top plan view of my device; and Fig. 2 is a longitudinal section thereof.

Referring more particularly to the drawing, the numeral 1 designates a cup which is provided inwardly of its marginal edge with an annular supporting wall 2. The bottom 3 of the cup is concave in form and formed in the bottom to one side of the center is an opening 4, the opening being arranged within the annular wall 2. A plurality of transversely spaced upstanding pins 5 are formed on the bottom of the cup, the pins forming a wall between the opening 4 and the remainder of the cup. A discharge lip 6 is formed on the peripheral wall of the cup at a point diametrically opposite the opening 4, and an opening 7 of relatively less diameter than the opening 4 is formed in the bottom of the cup between the lip 6 and the pins 5. A suitable finger piece 8 is formed on one side of the cup, whereby the device may be easily carried or tilted when desired.

In the practical use of my invention, the separator is placed in a suitable receptacle, and an egg is broken and allowed to drop into the cup between the pins 5 and the lip 6. Owing to the concave form of the bottom of the cup, the white of the egg will pass between and around the pins 5 and downwardly through the opening 4 into the receptacle. When that portion of the white of the egg which is separated from the yolk by gravity, has passed downwardly through the opening 4, the finger piece 8 is grasped and the cup is tilted in the direction of the lip 6, so that the yolk will be discharged from the cup through the lip. That portion of the white of the egg which clings to the yolk, will be loosened by coming in contact with the walls of the opening 7, and will be allowed to pass downwardly through the opening into the receptacle provided therefor, whereby the white of the egg will be completely separated from the yolk.

Having thus fully described my invention, what I desire to claim and secure by Letters Patent is:

1. An egg separator comprising a cup having a concave bottom, said bottom having an opening formed therein to one side of the center, a plurality of transversely spaced upstanding pins formed on said bottom, and a lip formed on said cup at a point diametrically opposite the opening in said bottom, as and for the purpose described.

2. An egg separator comprising a cup having an annular supporting wall formed thereon inwardly of its marginal edge, said cup having a concave bottom, said bottom having an opening formed therein, and a plurality of upstanding pins formed on said bottom, as and for the purpose described.

3. An egg separator comprising a cup having a concave bottom, a plurality of transversely spaced upstanding pins formed on said bottom, said bottom having an opening therein formed on one side of said pins, and a lip formed on said cup on the opposite side of said pins, as and for the purpose described.

4. A device of the character described comprising a cup having a concave bottom, a plurality of transversely spaced upstanding pins arranged centrally on said bottom, said bottom having an opening formed therein to one side of said pins, a lip formed on said cup to the other side of said pins, and an auxiliary opening formed in said bottom between said pins and said lip, as and for the purpose described.

In testimony whereof I hereunto affix my signature in the presence of two witnesses.

GRANT SHERMAN MARTIN.

Witnesses:
B. C. WHITAKER,
JOHN W. BARLEY.